United States Patent
Nakamura et al.

(10) Patent No.: US 10,556,626 B2
(45) Date of Patent: Feb. 11, 2020

(54) VEHICLE FRONT BODY STRUCTURE

(71) Applicant: MAZDA MOTOR CORPORATION, Aki-gun, Hiroshima (JP)

(72) Inventors: Takeshi Nakamura, Hiroshima (JP); Keizo Kawasaki, Hiroshima (JP); Shigeaki Watanabe, Hiroshima (JP); Kenji Maruyama, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 15 days.

(21) Appl. No.: 15/761,067

(22) PCT Filed: Jan. 5, 2017

(86) PCT No.: PCT/JP2017/000063
§ 371 (c)(1),
(2) Date: Mar. 16, 2018

(87) PCT Pub. No.: WO2017/126317
PCT Pub. Date: Jul. 27, 2017

(65) Prior Publication Data
US 2018/0257715 A1    Sep. 13, 2018

(30) Foreign Application Priority Data

Jan. 20, 2016  (JP) ................................. 2016-008985

(51) Int. Cl.
*B62D 25/08* (2006.01)
*B62D 21/15* (2006.01)
(52) U.S. Cl.
CPC ........... *B62D 25/08* (2013.01); *B62D 21/152* (2013.01); *B62D 25/082* (2013.01)

(58) Field of Classification Search
CPC ..... B62D 25/08; B62D 25/081; B62D 25/082; B62D 25/088
See application file for complete search history.

(56) References Cited

U.S. PATENT DOCUMENTS 5,031,958 A * 7/1991 Fujita ................... B62D 25/082
                                                180/89.1
5,052,742 A * 10/1991 Akoshima ............ B62D 25/081
                                                296/192

(Continued)

FOREIGN PATENT DOCUMENTS

JP    H0332987 A    2/1991
JP    H03038288 U1    4/1991

(Continued)

OTHER PUBLICATIONS

ISA Japan Patent Office, International Search Report Issued in PCT Application No. PCT/JP2017/000063, dated Mar. 7, 2017, WIPO, 2 pages.

*Primary Examiner* — Gregory A Blankenship
(74) *Attorney, Agent, or Firm* — Alleman Hall Creasman & Tuttle LLP

(57) ABSTRACT

A vehicle front body structure includes: a dash panel; an apron reinforcement extending forward on an outside in the vehicle width direction of an engine room; a suspension housing coupled to the apron reinforcement in front of the dash panel; a cowl side panel extending in a front-rear direction between a rear portion of the suspension housing and the dash panel in side view of the vehicle, the cowl side panel 11 constituting a wall portion on the outside in the vehicle width direction of the engine room; and a first reinforcing member dividing a space surrounded by the apron reinforcement and the cowl side panel back and forth.

5 Claims, 10 Drawing Sheets

(56) References Cited

U.S. PATENT DOCUMENTS

| | | | | |
|---|---|---|---|---|
| 6,209,950 | B1* | 4/2001 | Hanyu | B62D 25/04 |
| | | | | 296/203.02 |
| 7,407,220 | B2* | 8/2008 | Kanagawa | B62D 25/088 |
| | | | | 296/187.09 |
| 9,371,093 | B1* | 6/2016 | Holmstrom | B62D 27/023 |
| 9,840,284 | B2* | 12/2017 | Kang | B62D 25/081 |
| 9,914,340 | B1* | 3/2018 | Bowers | B60H 1/28 |
| 2008/0036243 | A1 | 2/2008 | Kanagawa et al. | |
| 2013/0062911 | A1* | 3/2013 | Takeuchi | B62D 25/082 |
| | | | | 296/203.02 |
| 2017/0203793 | A1* | 7/2017 | Nakamura | B62D 21/152 |
| 2017/0203794 | A1* | 7/2017 | Nakamura | B62D 25/025 |
| 2018/0257715 | A1* | 9/2018 | Nakamura | B62D 25/082 |

FOREIGN PATENT DOCUMENTS

| | | |
|---|---|---|
| JP | H04078078 U1 | 7/1992 |
| JP | H04122284 U1 | 11/1992 |
| JP | 200180544 A | 3/2001 |
| JP | 200188743 A | 4/2001 |
| JP | 2007131028 A | 5/2007 |
| JP | 200837337 A | 2/2008 |
| JP | 201310414 A | 1/2013 |

\* cited by examiner

VEHICLE FRONT BODY STRUCTURE

TECHNICAL FIELD

The present invention relates to a vehicle front body structure, more particularly to a structure around an apron reinforcement to which a suspension housing is coupled.

BACKGROUND ART

Because an upper portion of a suspension is fastened and fixed to a suspension housing provided on a body side of the vehicle, the suspension housing is easily deformed in a vertical direction due to vertical vibration input from the suspension, and NVH (Noise Vibration Harshness) performance is degraded due to the deformation. In order to improve the NVH performance, various approaches have been made to improve rigidity of the suspension housing.

For example, PTL 1 discloses a vehicle front structure including an apron reinforcement extending forward from an upper portion of a hinge pillar and a suspension housing provided on the inside in the vehicle width direction of the apron reinforcement. In the vehicle front structure, an inside surface of the apron reinforcement is directly coupled to an outside surface of the suspension housing, and an upper surface of the apron reinforcement and the outside surface of the suspension housing are coupled by a coupling expansion member.

According to the structure of PTL 1, because the coupling portion between the suspension housing and the apron reinforcement increases by a coupling area coupled by a coupling expansion member in addition to a directly-coupled coupling area, a stronger coupling structure is constructed. Consequently, the support rigidity of the suspension housing by the apron reinforcement is improved, so that the rigidity is improved.

CITATION LIST

Patent Literature

PTL 1: Japanese Unexamined Patent Publication No. 2007-131028

SUMMARY OF INVENTION

Technical Problem

However, the structure of PTL 1 improves the rigidity of the suspension housing by improving the coupling rigidity with the apron reinforcement, which particularly prevents relative deformation (for example, inward inclination) of the suspension housing with respect to the apron reinforcement. When the vertical vibration input from the suspension is large, the suspension housing is deformed in the vertical direction and/or the vehicle width direction together with the apron reinforcement, and the NVH performance tends to be degraded.

That is, in order to further improve the NVH performance of the vehicle, there is still room for further improvement from the viewpoint of preventing the deformation of the apron reinforcement, particularly the deformation in the vehicle width direction.

The present invention has been made in view of the above problem, and an object of the present invention is to improve the NVH performance by preventing the deformation in the vehicle width direction of the apron reinforcement in the vehicle front body structure in which the suspension housing is coupled to the apron reinforcement.

Solution to Problem

In order to solve the above problem, the present invention is configured as follows.

A first aspect of the present invention is a vehicle front body structure including: a dash panel extending in a vehicle width direction to separate an engine room from a vehicle interior; an apron reinforcement extending forward on an outside in the vehicle width direction of the engine room; a suspension housing coupled to the apron reinforcement in front of the dash panel; a cowl side panel extending in a front-rear direction between a rear portion of the suspension housing and the dash panel in side view of the vehicle, the cowl side panel constituting a wall portion on the outside in the vehicle width direction of the engine room; and a reinforcing member dividing a space surrounded by the apron reinforcement and the cowl side panel back and forth.

According to a second aspect of the present invention, in the first aspect, a partition wall partitioning the space is formed into a plate shape in the reinforcing member.

According to a third aspect of the present invention, in the first aspect of the present invention, the reinforcing member includes: a partition wall partitioning an inside of the closed section back and forth; and at least two side surface portions extending in the front-rear direction from a peripheral edge of the partition wall, the two side surface portions being coupled to the apron reinforcement and/or the cowl side panel, and the two side surface portions are coupled or integrally formed so as to be continuous.

According to a fourth aspect of the present invention, any one of the first to third aspects of the invention further includes a cowl top panel that extends in the vehicle width direction while being coupled to an upper portion of the dash panel. The cowl top panel includes a coupling member, which is coupled to the cowl side panel at a position overlapping the reinforcing member in side view of the vehicle, at an outside end in the vehicle width direction.

In the fourth aspect of the present invention, the term of overlapping means that at least a part of a certain member and at least a part of another member overlap each other.

Advantageous Effects of Invention

According to the invention of each claim of the present application, the following effects can be obtained by the above configurations.

In the first aspect of the present invention, the rigidity in the vehicle width and vertical directions of the apron reinforcement can be improved by constructing a part of the closed section of the apron reinforcement with the cowl side panel constituting the side wall in the vehicle width direction of the engine room. Additionally, the reinforcing member can improve the sectional rigidity in the vehicle width and vertical directions of the apron reinforcement, and improve the bending rigidity in the vehicle width direction of the cowl side panel overlapping the apron reinforcement. Consequently, the apron reinforcement and the cowl side panel effectively prevent deformation (for example, the inward inclination inclined inward in the vehicle width direction) in the vertical and vehicle width directions of the suspension housing due to load input in the vertical direction from the suspension, so that the NVH performance of the vehicle can be improved.

In the second aspect of the present invention, the reinforcing member can easily be constructed.

In the third aspect of the present invention, because the reinforcing member is formed in the box shape, sectional rigidity of the apron reinforcement can further be improved compared with the case that the partition wall is formed into a plate shape. As a result, the rigidity in the vertical and vehicle width directions of the suspension housing is further improved, so that the NVH performance of the vehicle can further be improved.

In the fourth aspect of the present invention, because the cowl side panel is supported in the vehicle width direction by the cowl top panel, the rigidity in the vehicle width direction of the cowl side panel is improved. Further, because the cowl side panel continues to the apron reinforcement with the reinforcing member interposed therebetween, the rigidity in the vehicle width direction of the apron reinforcement is improved. As a result, the rigidity in the vehicle width direction of the suspension housing is further improved, so that the NVH performance of the vehicle can further be improved.

That is, in the vehicle front body structure of the present invention, by suppressing deformation of the apron reinforcement in the vehicle width direction, the deformation of the suspension housing can be prevented in the vehicle width direction to improve the NVH performance.

DESCRIPTION OF EMBODIMENTS

Figure 1:
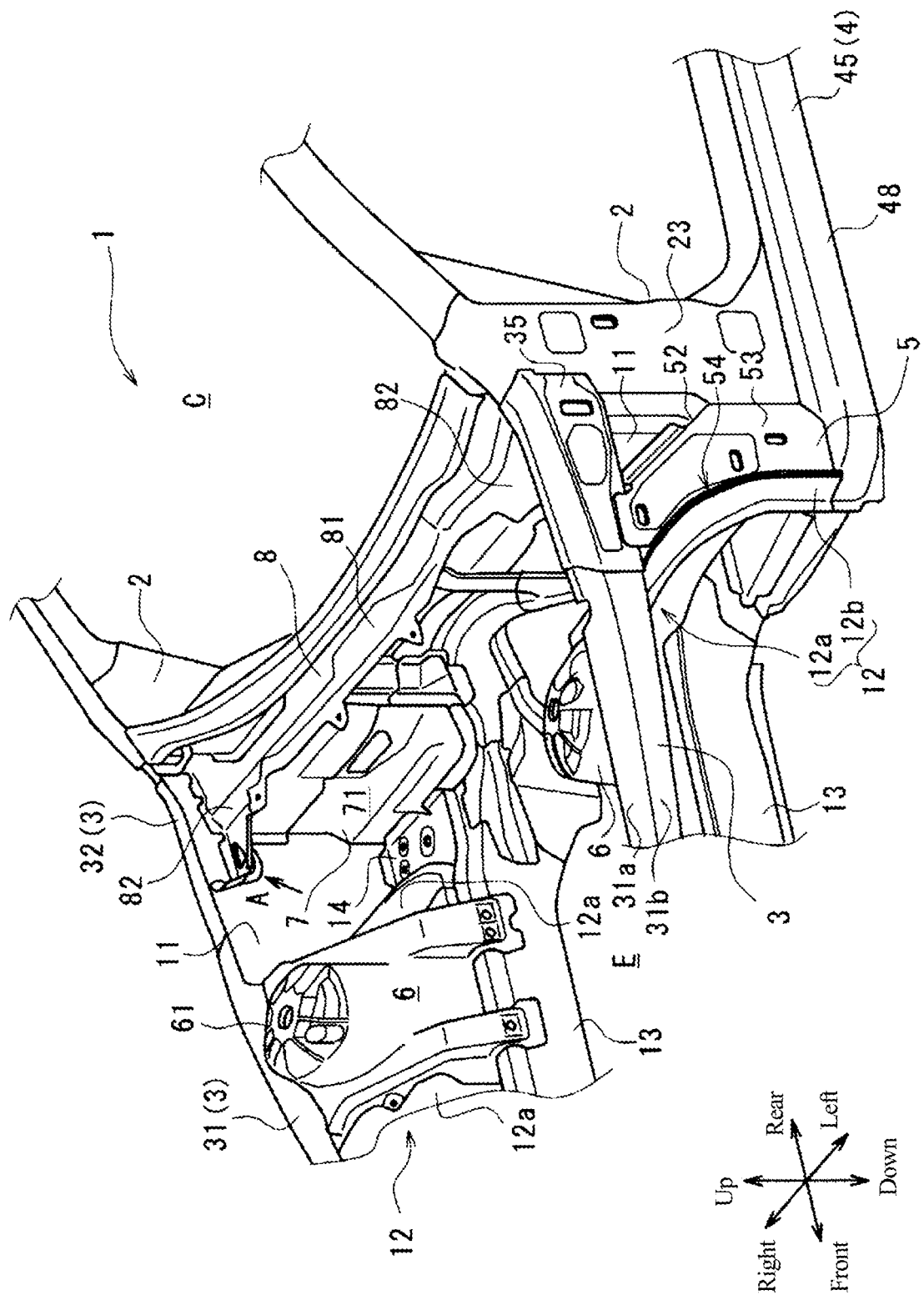
FIG. 1 is a perspective view illustrating a front body structure according to an embodiment of the present invention.

Hereinafter, an embodiment of the present invention will be described with reference to the attached drawings. In the following description, although a front body structure 1 of an automobile (vehicle) will be described on one side in a vehicle width direction, the front body structure 1 is laterally symmetrical, and the same holds true for the other side. Unless otherwise specified, front/rear, inside/outside, and up/down directions in the drawings indicate a front-rear direction, the vehicle width direction, and a vertical direction of the vehicle, respectively.

(Overall Configuration of Front Body Structure 1)

FIG. 1 illustrates the front body structure 1 according to an embodiment of the present invention. As illustrated in FIG. 1, the front body structure 1 includes a hinge pillar 2 vertically extending in a front side portion of a vehicle interior C, an apron reinforcement 3 that is connected to an upper portion of the hinge pillar 2 while extending forward, a side sill 4 that is connected to a lower portion of the hinge pillar 2 while extending rearward, and a connecting member 5 that connects the apron reinforcement 3 to the hinge pillar 2 in a diagonal manner while connecting the apron reinforcement 3 to a front portion of the side sill 4. A front door (not illustrated) is pivoted on the hinge pillar 2 so as to be opened and closed.

A cowl side panel 11 extending in the front-rear direction is provided on an inside in the vehicle width direction of the apron reinforcement 3, and an outside end in the vehicle width direction of an engine room E is partitioned by the cowl side panel 11. A wheel house 12 in which a front wheel (not illustrated) is accommodated is formed in the front portion of the cowl side panel 11. The wheel house 12 includes a wheel house inner 12a located on the inside in the vehicle width direction and a wheel house outer 12b located on the outside in the vehicle width direction while the cowl side panel 11 is interposed between the wheel house inner 12a and the wheel house outer 12b, and the wheel house 12 is constructed by coupling the wheel house inner 12a and the wheel house outer 12b to the front portion of the cowl side panel 11 from both sides in the vehicle width direction.

The wheel house inner 12a is formed so as to protrude upward and so as to cover a front wheel from the inside and the upper side in the vehicle width direction. The wheel house outer 12b is formed into an arc shape so as to cover the front wheel from above. A suspension housing 6 bulging upward into a cylindrical shape is provided in a substantially central portion in the front-rear direction of the wheel house inner 12a. An upper portion of a front suspension (not illustrated) is fastened and fixed to an upper surface portion 61 of the suspension housing 6.

A side frame 13 extending in the front-rear direction is provided below the inside in the vehicle width direction of the apron reinforcement 3, both ends in the vehicle width direction of the suspension housing 6 are connected to the apron reinforcement 3 and the side frame 13, and the apron reinforcement 3 is stretched across the vehicle width direction.

A dash panel 7 partitioning the vehicle interior C and the engine room E back and forth is provided at the back of the suspension housing 6. A cowl top panel 8 is provided above the dash panel 7. The dash panel 7 and the cowl top panel 8 extend in the vehicle width direction between the left and right cowl side panels 11, 11.

An apron rear panel 14 is provided so as to vertically divide a region in the front-rear direction between the suspension housing 6 and the dash panel 7 and in the vehicle width direction between the cowl side panel 11 and the side frame 13.

Figure 2:
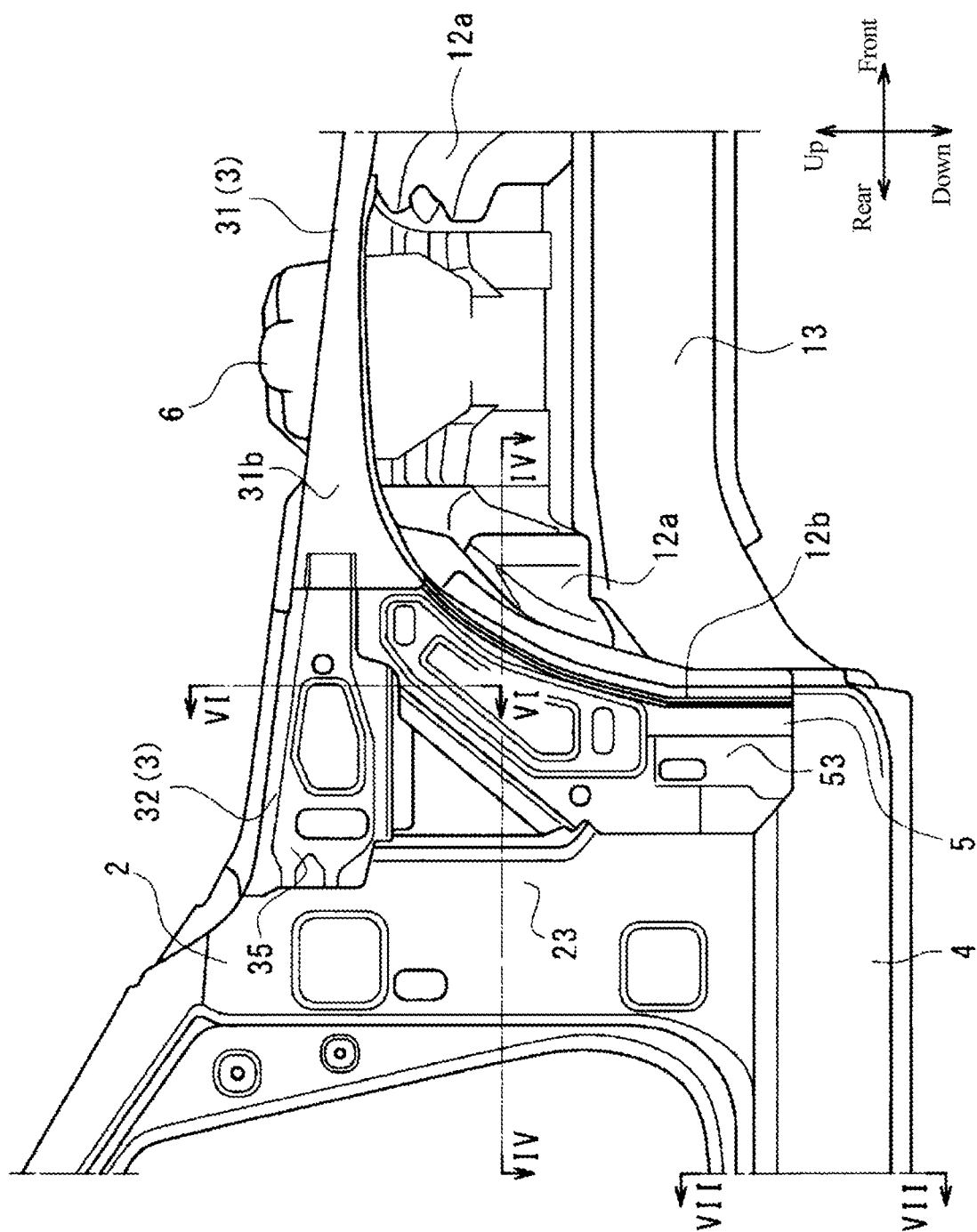
FIG. 2 is a right side view of the front body structure in FIG. 1.
Figure 3:
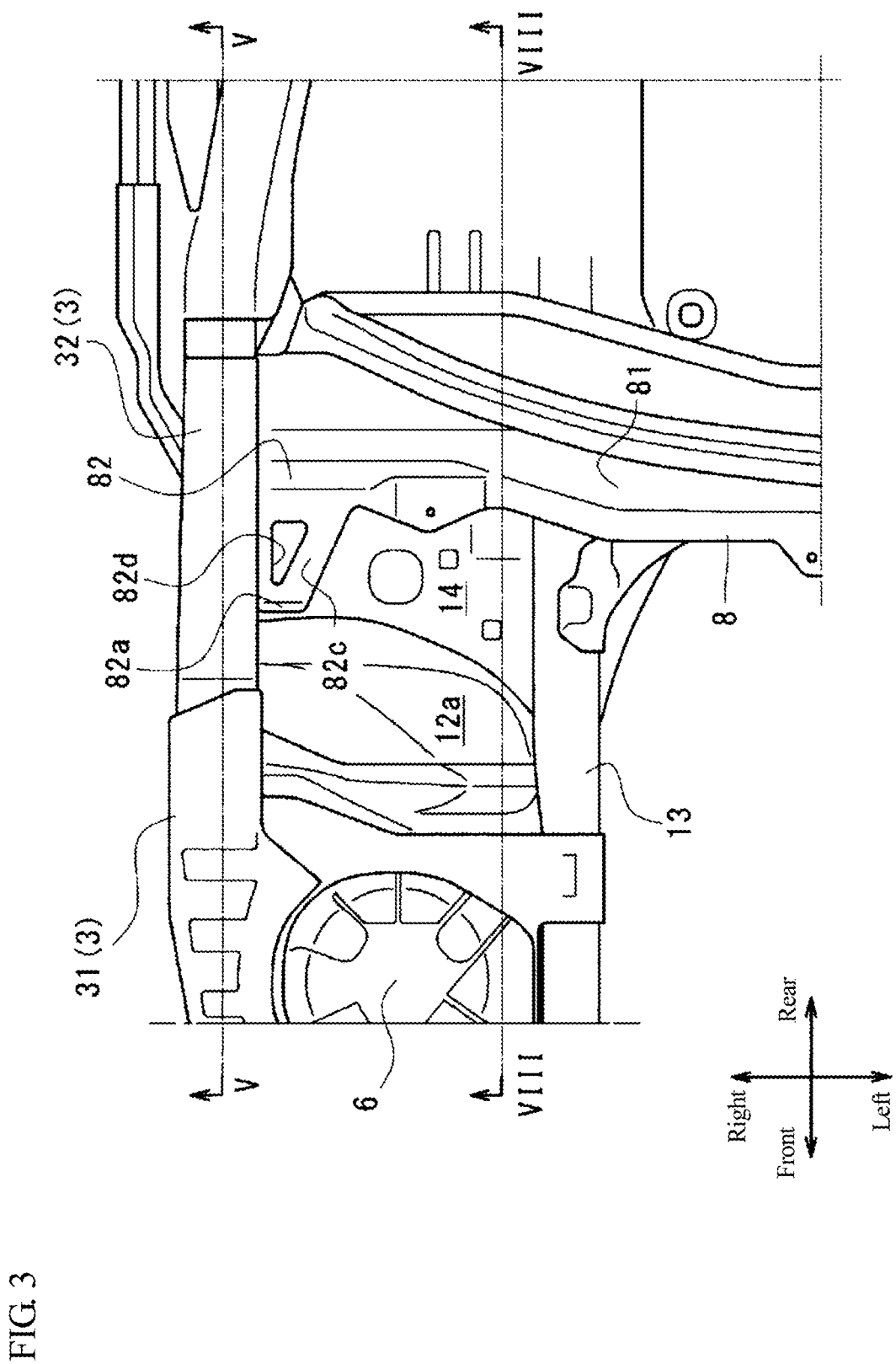
FIG. 3 is a plan view of the front body structure in FIG. 1.

Each member will specifically be described below. FIG. 2 is a right side view of the front body structure 1, and FIG. 3 is a plan view of the front body structure 1. FIGS. 4 to 8 illustrate sectional views at each position in FIGS. 2 and 3.

(Hinge Pillar 2)

Figure 4:
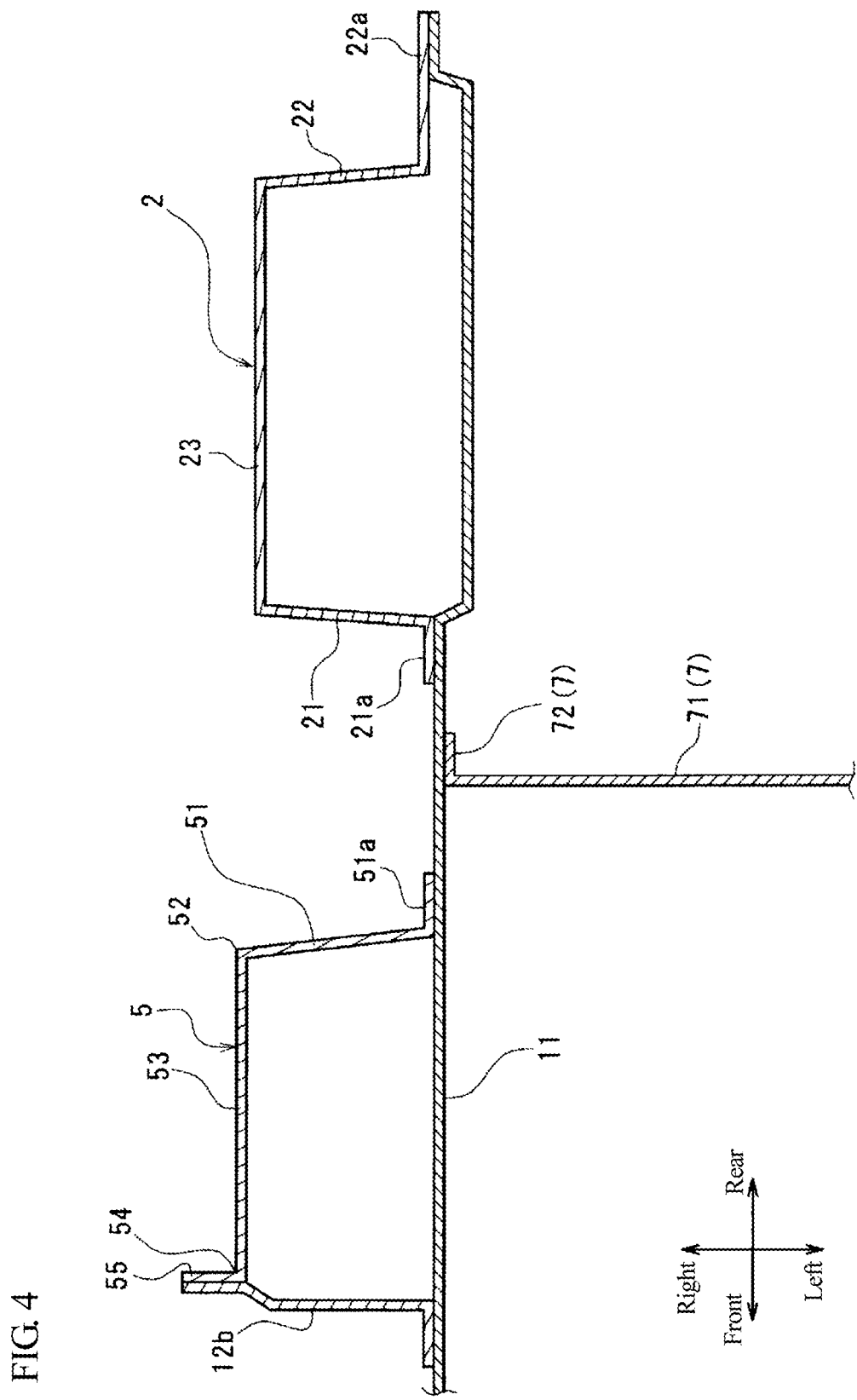
FIG. 4 is a perspective view illustrating a section taken along a line IV-IV in FIG. 2.

FIG. 4 is a sectional view taken along a line IV-IV in FIG. 2, and illustrates a horizontal sectional view of the hinge pillar 2 and the connecting member 5. As illustrated in FIG. 4, the hinge pillar 2 is formed in a U-shaped section in which the inside in the vehicle width direction is opened, and includes a front surface portion 21 and a rear surface portion 22, which extend vertically, and a side surface portion 23 connecting outside ends in the width directions of the front surface portion 21 and the rear surface portion 22 to each other back and forth. A front flange 21a extending forward from an inside end in the vehicle width direction is formed in the front surface portion 21. A rear flange 22a extending rearward from the inside end in the vehicle width direction is formed in the rear surface portion 22.

In the hinge pillar 2, the front flange 21a and the rear flange 22a are coupled to the cowl side panel 11 so as to extend along the cowl side panel 11 from the outside in the vehicle width direction. That is, the hinge pillar 2 constitutes a closed section extending vertically together with the cowl side panel 11.

Figure 5:
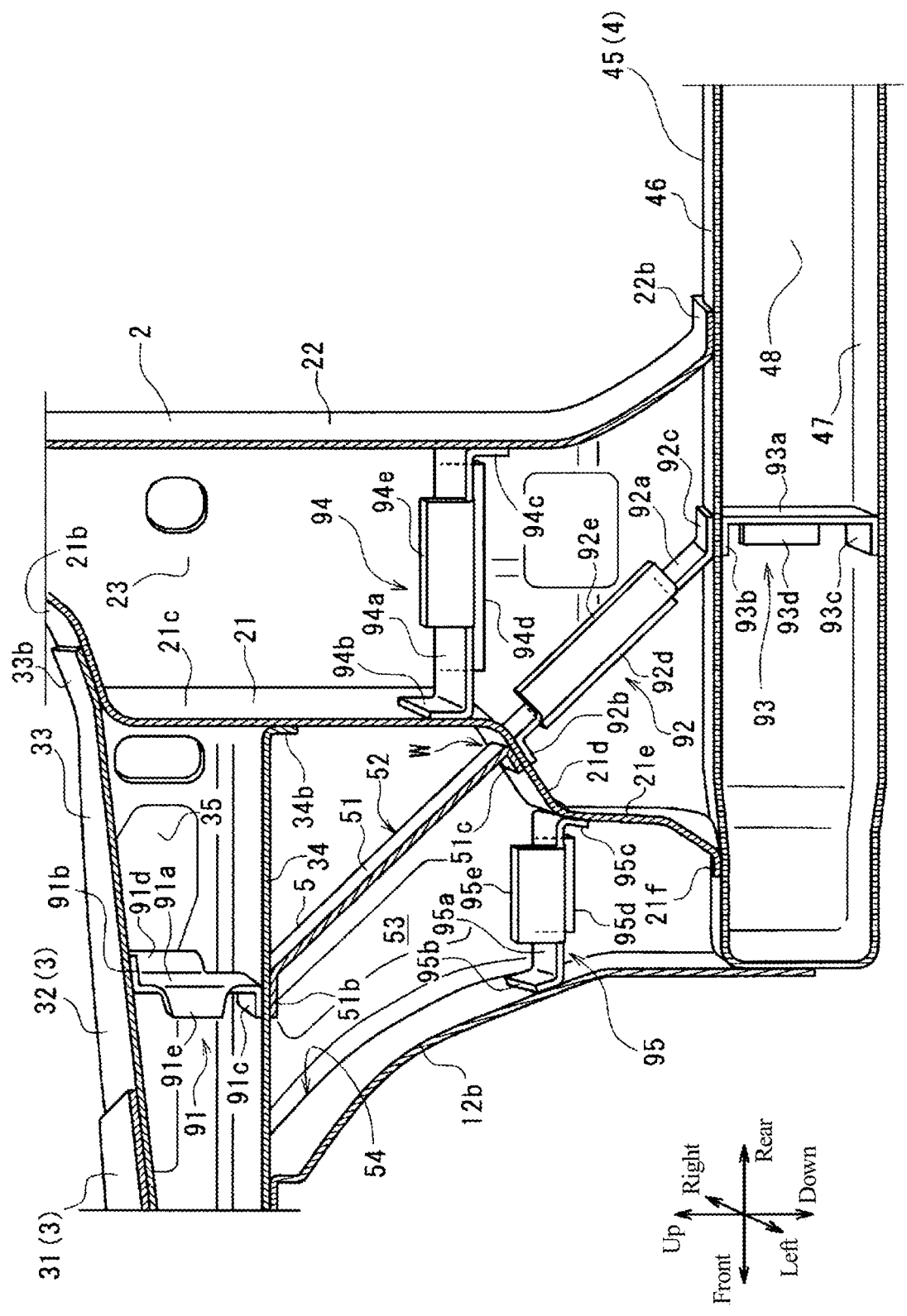
FIG. 5 is a sectional view taken along a line V-V in FIG. 3.

FIG. 5 is a sectional view taken along a line V-V in FIG. 3, is a longitudinal sectional view parallel to the front-rear direction and the vertical direction passing through the outside in the vehicle width direction with respect to the cowl side panel 11, and illustrates longitudinal sectional view of the hinge pillar 2, the apron reinforcement 3, the side sill 4, and the connecting member 5.

As illustrated in FIG. 5, the front surface portion 21 of the hinge pillar 2 is formed so as to be located forward in a stepwise manner as the front surface portion 21 goes downward, and a first step portion 21b extending forward in the upper end of the front surface portion 21, a first front surface portion 21c extending downward from the front end of the first step portion 21b, a second step portion 21d (connection surface portion) extending in a direction inclined forward and downward from the lower end of the first front surface portion 21c, a second front surface portion 21e extending downward from the lower end of the second step portion 21d, and a front surface lower flange 21f extending forward from the lower end of the second front surface portion 21e are formed in the front surface portion 21. A rear-surface lower flange 22b extending rearward is formed at the lower end of the rear surface portion 22.

(Apron Reinforcement 3)

As illustrated in FIG. 1, the apron reinforcement 3 is divided back and forth into a front apron reinforcement 31 located in the front and a rear apron reinforcement 32 located in the rear. The front apron reinforcement 31 extends back and forth on the outside in the vehicle width direction of the suspension housing 6, and the rear apron reinforcement 32 connects the front apron reinforcement 31 and the hinge pillar 2 back and forth.

The front apron reinforcement 31 is formed in an L-shaped section including an upper surface portion 31a extending back and forth and a side surface portion 31b extending downward from the outside end in the vehicle width direction of the upper surface portion 31a, and the front apron reinforcement 31 is coupled to an arm portion formed in the upper portion of the suspension housing 6 and on the outside in the vehicle width direction to constitute a closed section extending back and forth together with the suspension housing 6. That is, vibration input mainly in the vertical direction from a front suspension (not illustrated) is efficiently transmitted to the apron reinforcement 3 constituting the closed section through the suspension housing 6.

Figure 6:
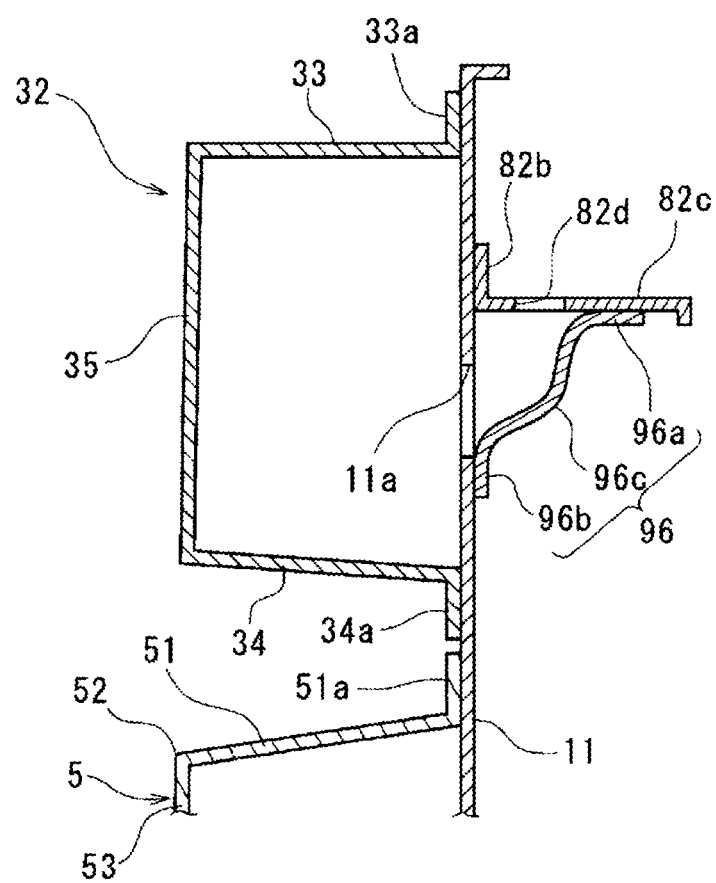
FIG. 6 is a sectional view taken along a line VI-VI in FIG. 2.

FIG. 6 is a sectional view taken along a line VI-VI in FIG. 2, and illustrates a longitudinal sectional view parallel to the vehicle width direction and the vertical direction of the rear apron reinforcement 32. As illustrated in FIG. 6, the rear apron reinforcement 32 is formed in a U-shaped section in which the inside in the vehicle width direction is opened, and includes a front surface portion 33 and a rear surface portion 34, which extend back and forth, and a side surface portion 35 vertically connecting outside ends in the width directions of the front surface portion 33 and the rear surface portion 34 to each other. An upper flange 33a extending upward from the inside end in the vehicle width direction is formed in the front surface portion 33. A lower flange 34a extending downward from the inside end in the vehicle width direction is formed in the lower surface portion 34.

In the rear apron reinforcement 32, the upper flange 33a and the lower flange 34a are coupled to the cowl side panel 11 from the outside in the vehicle width direction. That is, the rear apron reinforcement 32 constitutes a closed section extending back and forth together with the cowl side panel 11.

As illustrated in FIG. 5, the rear apron reinforcement 32 includes a rear flange 34b extending downward from the rear end of the lower surface portion 34. In the rear apron reinforcement 32, the upper surface portion 33 is coupled to the first step portion 21b of the hinge pillar 2 at a rear end 33b of the upper surface portion 33 from above, and the rear flange 34b is coupled to the first front surface portion 21c of the hinge pillar 2 from the front side. As illustrated in FIG. 1, in the rear apron reinforcement 32, the side surface portion 35 is coupled from the outside in the vehicle width direction along the side surface portion 23 of the hinge pillar 2.

(Side Sill 4)

Figure 7:
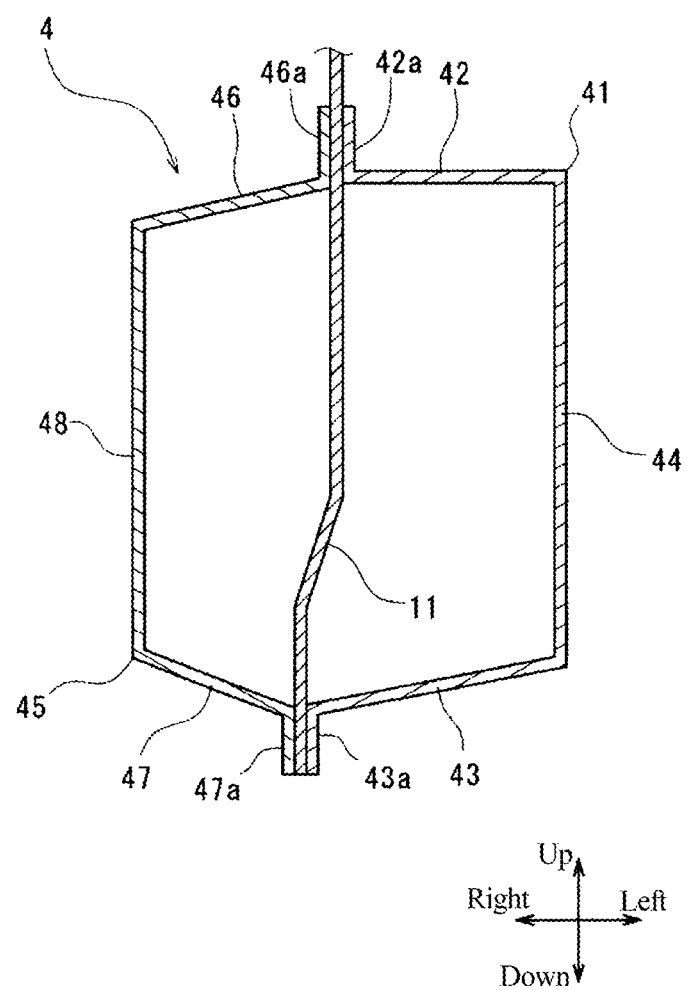
FIG. 7 is a sectional view taken along a line VII-VII in FIG. 2.

FIG. 7 is a sectional view taken along a line VII-VII in FIG. 2, and illustrates a longitudinal sectional view parallel to the vehicle width direction and the vertical direction of the side sill 4. As illustrated in FIG. 7, the side sill 4 includes a side sill inner 41 located on the inside in the vehicle width direction and a side sill outer 45 located on the outside in the vehicle width direction while the cowl side panel 11 interposed between the side sill inner 41 and the side sill outer 45, and the side sill 4 is constructed by coupling the side sill inner 41 and the side sill outer 45 to each other from both sides in the vehicle width direction of the cowl side panel 11.

Specifically, the side sill inner 41 is formed in a U-shaped section in which the outside in the vehicle width direction is opened, and includes an inner upper surface portion 42 and an inner lower surface portion 43, which extend in the front-rear direction, and an inner side surface portion 44 vertically connecting the inside ends in the vehicle width direction of the inner upper surface portion 42 and the inner lower surface portion 43 to each other. An inner upper flange 42a extending upward from the outside end in the vehicle width direction is formed in the inner upper surface portion 42. An inner lower flange 43a extending downward from the outside end in the vehicle width direction is formed in the inner lower surface portion 43.

The side sill outer 45 is formed in a U-shaped section in which the inside in the vehicle width direction is opened, and includes an outer upper surface portion 46 and an outer lower surface portion 47, which extend in the front-rear direction, and an outer side surface portion 48 vertically connecting the outside ends in the vehicle width direction of the outer upper surface portion 46 and the outer lower surface portion 47 to each other. An outer upper flange 46a extending upward from the inside end in the vehicle width direction is formed on the outer upper surface portion 46. An outer lower flange 47a extending downward from the inside end in the vehicle width direction is formed on the outer lower surface portion 47.

In the side sill inner 41 and the side sill outer 45, the inner upper flange 42a and the outer upper flange 46a are coupled from both sides in the vehicle width direction of the cowl side panel 11 while corresponding to each other, and the inner lower flange 43a and the outer lower flange 47a are coupled while corresponding to each other. Consequently, the side sill inner 41 and the side sill outer 45 constitute a closed section extending back and forth, and the closed section is further divided in the vehicle width direction by the cowl side panel 11. That is, the closed section extending back and forth is formed between the side sill inner 41 and the cowl side panel 11 and between the side sill outer 45 and the cowl side panel 11.

As illustrated in FIG. 5, the hinge pillar 2 is coupled to the outer upper surface portion 46 of the side sill outer 45 while the front lower flange 21f and the rear lower flange 22b are disposed from above.

(Connecting Member 5)

As illustrated in FIG. 1, the connecting member 5 extends obliquely rearward and downward. Also referring to FIG. 4, the connecting member 5 includes a rear surface portion 51 having a width in the vehicle width direction and extending rearward and downward and a side surface portion 53 extending forward while a first bent portion 52 bent forward from the outside end in the vehicle width direction of the rear surface portion 51 is interposed between the rear surface portion 51 and the side surface portion 53. The connecting member 5 is formed into an L-shaped section. A rear flange 51a extending rearward is formed at the inside end in the vehicle width direction of the rear surface portion 51. A front flange 55 (front surface portion) extending toward the outside in the vehicle width direction is formed at a front edge of the side surface portion 53 while a second bent portion 54 bent into an arc shape toward the outside in the vehicle width direction along a wheel house outer 12b.

In the connecting member 5, the rear flange 51a is coupled to the cowl side panel 11 from the outside in the vehicle width direction, and the front flange 55 is coupled to the outside end in the vehicle width direction of the wheel house outer 12b from the rear side. That is, in the connecting member 5, the closed section extending obliquely rearward and downward is formed together with the cowl side panel 11 and the wheel house outer 12b.

As illustrated in FIG. 5, an upper flange 51b extending forward from the upper end and a lower flange 51c extending forward and downward from the lower end are formed in the rear surface portion 51 of the connecting member 5. In the connecting member 5, the upper flange 51b is coupled to the lower surface portion 34 of the rear apron reinforcement 32 from the lower side, and the lower flange 51c is coupled to the second step portion 21d of the hinge pillar 2 from the front and upper side. At this point, in side view of the vehicle, the rear surface portion 51 (and the first bent portion 52) of the connecting member 5 and the second step portion 21d of the hinge pillar 2 are disposed in a positional relationship in which the rear surface portion 51 and the second step portion 21d are substantially orthogonal to each other.

As illustrated in FIG. 1, in the connecting member 5, the upper portion of the side surface portion 53 is coupled to the side surface portion 35 of the rear apron reinforcement 32 from the outside in the vehicle width direction, and the lower portion of the side surface portion 53 is coupled to the side surface portion 23 of the hinge pillar 2 and the outer side surface portion 48 of the side sill outer 45 of the side sill 4 from the outside in the vehicle width direction. That is, in the connecting member 5, the rear apron reinforcement 32 and the side sill 4 continue to each other while the pair of front and rear first and second bent portions 52, 54 located at the front and the rear ends of the side surface portion 53 is interposed between the rear apron reinforcement 32 and the side sill 4.

Specifically, as illustrated in FIG. 5, in the connecting member 5, the lower portion of the apron reinforcement 3 and the front portion of the side sill outer 45 continue to each other while the second bent portion 54 located on the front side of the connecting member 5 is interposed between the lower portion of the apron reinforcement 3 and the front portion of the side sill outer 45. In the connecting member 5, the apron reinforcement 3 and the side sill outer 45 continue to each other together with the first to third reinforcing members 91 to 93 while the first bent portion 52 located on the rear side of the connecting member 5 is interposed between the apron reinforcement 3 and the side sill outer 45. Because the bent first and second bent portions 52, 54 have high rigidity, the apron reinforcement 3 and the side sill 4 continue to each other with the bent portions 52, 54 interposed therebetween, which allows the apron reinforcement 3 to be firmly coupled to the side sill 4.

Hereinafter, the first to third reinforcing members 91 to 93 will specifically be described with reference to FIG. 5.

(First Reinforcing Member 91)

The first reinforcing member 91 is provided inside the closed section constructed with the apron reinforcement 3, and formed as a bulkhead-shaped member including a partition wall 91a extending vertically in the section to partition the first reinforcing member 91 back and forth, an upper flange 91b extending rearward from the upper end of the partition wall 91a, a lower flange 91c extending forward from the lower end of the partition wall 91a, an outside flange 91d extending rearward from the outside end in the vehicle width direction, and an inside flange 91e extending forward from the inside end in the vehicle width direction. In the first reinforcing member 91, the partition wall 91a is formed into a plate shape.

In the first reinforcing member 91, the upper flange 91b and the lower flange 91c are coupled to the upper surface portion 33 and the lower surface portion 34 of the rear apron reinforcement 32 from the inside of the section, respectively, and the outside flange 91d is coupled to the side surface portion 35 of the rear apron reinforcement 32 from the inside of the section. In the first reinforcing member 91, the inner flange 91e is coupled to the cowl side panel 11 (see FIG. 1) along the inside of the section. A space surrounded by the apron reinforcement 3 and the cowl side panel 11 is partitioned back and forth by the partition wall 91a.

The first reinforcing member 91 is provided at a substantially intermediate position in the front-rear direction of the rear apron reinforcement 32, whereby the rigidity of the section of the rear apron reinforcement 32 is more effectively enhanced. The first reinforcing member 91 is positioned such that the lower end of the partition wall 91a and the rear surface portion 51 of the connecting member 5 continue to each other at the upper and lower portions of the lower surface portion 34 of the apron reinforcement 3. In other words, the partition wall 91a and the first bent portion 52 of the connecting member 5 are configured to continue. The lower flange 91c and the upper flange 51b face each other with the lower surface portion 34 interposed therebetween, and the lower flange 91c and the upper flange 51b are coupled together with the lower surface portion 34 sandwiched therebetween.

(Second Reinforcing Member 92)

The second reinforcing member 92 is provided inside the closed section constructed with the hinge pillar 2 and the side sill 4, and formed as a bulkhead-shaped member including a partition wall 92a extending forward and upward to partition the second reinforcing member 92 in a direction inclined rearward and upward, an upper flange 92b extending forward and downward from the upper end of the partition wall 92a, a lower flange 92c extending rearward from the lower end of the partition wall 92a, an outside flange 92d extending downward from the outside end in the vehicle width direction, and an inside flange 92e extending upward from the inside end in the vehicle width direction.

In the second reinforcing member 92, the upper flange 92b is coupled to the second step portion 21d of the hinge pillar 2 from the inside of the section. In side view of the vehicle, the partition wall 92a extends to the rear surface portion 51 (that is, the first bent portion 52) of the connecting member 5 at the substantially same angle with respect to the horizontal direction, and continues inside and outside of the closed section constructed with the hinge pillar 2 while the second step portion 21d is interposed between the partition wall 92a and the rear surface portion 51.

As described above, the rear surface portion 51 of the connecting member 5 and the second step portion 21d of the hinge pillar 2 are orthogonal to each other. Consequently, the partition wall 92a extending continuously in parallel to the rear surface portion 51 of the connecting member 5 is also orthogonal to the second step portion 21d. As a result, the lower flange 51c of the connecting member 5 and the upper flange 92b of the second reinforcing member 92 face each other with the second step portion 21d of the hinge pillar 2 interposed therebetween, so that the lower flange 51c and the upper flange 92b are coupled to each other with the second step portion 21d interposed therebetween.

Because the rear surface portion 51 and the partition wall 92a are orthogonal to the second step portion 21d, a coupling portion W (the lower flange 51c and the upper flange 92b) is easily coupled to each other while the rear surface portion 51 and the partition wall 92a do not block access of a coupling tool (for example, a spot-welding gun) to the coupling portion W.

In the second reinforcing member 92, the lower flange 92c is coupled to the outer upper surface portion 46 of the side sill outer 45 from above. In the second reinforcing member 92, the outside flange 92d is coupled to the inside of the section of the side surface portion 23 of the hinge pillar 2, and the inside flange 92e is coupled to the cowl side panel 11 from the outside in the vehicle width direction.

(Third Reinforcing Member 93)

The third reinforcing member 93 is provided inside the closed section constructed between the side sill outer 45 and the cowl side panel 11 in the closed section constructed with the side sill 4. The third reinforcing member 93 is formed as a bulkhead-shaped member including a partition wall 93a extending vertically in the section to partition the third reinforcing member 93 back and forth and an upper flange 93b, a lower flange 93b, and an outside flange 93d, which extend forward from the upper end, the lower end, and the outside end in the vehicle width direction, respectively.

In the third reinforcing member 93, the upper flange 93b, the lower flange 93c, and the outside flange 93d are coupled to the outer upper surface portion 46, the outer lower surface portion 47, and the outer side surface portion 48 of the side sill outer 45 from the inside of the section, respectively.

In side view of the vehicle, the partition wall 93a continues to the partition wall 92a of the second reinforcing member 92 while the outer upper surface portion 46 inside and outside the closed section constructed with the side sill outer 45 is interposed between the partition wall 93a and the partition wall 92a. Specifically, the lower flange 92c of the second reinforcing member 92 and the upper flange 93b of the third reinforcing member 93 face each other with the outer upper surface portion 46 interposed therebetween, whereby the lower flange 92c and the upper flange 93b are coupled to each other with the outer upper surface portion 46 sandwiched therebetween. As a result, the partition wall 92a and the partition wall 93a continue to each other with the outer upper surface portion 46 interposed therebetween.

Consequently, the apron reinforcement 3 (rear apron reinforcement 32) and the side sill 4 (side sill outer 45) continue firmly from the upper end to the lower end while the first reinforcing member 91, the rear surface portion 51 (first bent portion 52) of the connecting member 5, the second reinforcing member 92, and the third reinforcing member 93 are interposed between the apron reinforcement 3 and the side sill 4.

Further, a fourth reinforcing member 94 is provided inside the closed section constructed with the hinge pillar 2, and a fifth reinforcing member 95 is provided inside the closed section constructed with the connecting member 5.

(Fourth Reinforcing Member 94)

The fourth reinforcing member 94 is provided so as to horizontally extend between the first front surface portion 21c and the rear surface portion 22 of the hinge pillar 2, and formed as a bulkhead-shaped member including a partition wall 94a vertically partitioning the section, a front flange 94b extending upward from the front end of the partition wall 94a, a rear flange 94c extending downward from the rear end of the partition wall 94a, an outside flange 94d extending downward from the outside end in the vehicle width direction, and an inside flange 94e extending upward from the inside end in the vehicle width direction.

In the fourth reinforcing member 94, the front flange 94b, the rear flange 94c, and the outside flange 94d are coupled to the front surface portion 21, the rear surface portion 22, and the side surface portion 23 of the hinge pillar 2 from the inside of the section, respectively. In the fourth reinforcing member 94, the inside flange 94e is coupled to the cowl side panel 11 from the outside in the vehicle width direction.

The fourth reinforcing member 94 is provided at the lower end of the first front surface portion 21c, and the front flange 94b is located in the vicinity of the coupling portion W of the lower flange 51c of the connecting member 5, the second step portion 21d of the hinge pillar 2, and the upper flange 92b of the second reinforcing member 92. Consequently, in the connecting member 5, the rear surface portion 51 (and the first bent portion 52) is supported back and forth by the fourth reinforcing member 94 in the vicinity of the coupling portion W.

(Fifth Reinforcing Member 95)

The fifth reinforcing member 95 is provided so as to horizontally extend between the wheel house outer 12b and the second front surface portion 21e of the hinge pillar 2, and formed as a bulkhead-shaped member including a partition wall 95a vertically partitioning the section, a front flange 95b extending upward from the front end of the partition wall 95a, a rear flange 95c extending downward from the rear end of the partition wall 95a, an outside flange 95d extending downward from the outside end in the vehicle width direction, and an inside flange 95e extending upward from the inside end in the vehicle width direction.

In the fifth reinforcing member 95, the front flange 95b is coupled to the wheel house outer 12b from the rear side, and the rear flange 95c is coupled to the second front surface portion 21e of the hinge pillar 2 from the front side. In the fifth reinforcing member 95, the outside flange 95d is coupled to the side surface portion 53 of the connecting member 5 from the inside of the section, and the inside flange 95e is coupled to the cowl side panel 11 from the outside in the vehicle width direction.

Although not illustrated, the fifth reinforcing member 95 is located at the substantially same level as the apron rear panel 14 (see FIG. 1) with the side surface portion 53 of the connecting member 5 interposed therebetween. Consequently, because the connecting member 5 is efficiently supported in the vehicle width direction by the apron rear panel 14 with the fifth reinforcing member 95 interposed therebetween, the rigidity in the vehicle width direction of the connecting member 5 is improved.

The dash panel 7 and the cowl top panel 8 will be described below.

(Dash Panel 7)

As illustrated in FIG. 1, the dash panel 7 includes a dash panel main body 71 extending in the vehicle width and vertical directions between the left and right cowl side panels 11. Also referring to FIG. 4, the dash panel main body 71 is located between the suspension housing 6 and the hinge pillar 2, more specifically, it is located closer to the hinge pillar 2 in the front-rear direction.

A pair of outside flanges 72, 72 (only one side is illustrated in FIG. 4) extending rearward is formed at both ends in the vehicle width direction of the dash panel body 71, and the outside flange 72 is coupled to the cowl side panel 11 from the inside in the vehicle width direction.

(Cowl Top Panel 8)

As illustrated in FIG. 1, the cowl top panel 8 includes a cowl top main body 81 that extends in the vehicle width direction in the upper portion of the engine room E while extending in the front-rear direction. For example, a wiper motor (not illustrated) is supported by the cowl top main body 81. A pair of left and right cowl top coupling portions 82, 82 that are the coupling portion to the cowl side panel 11 is formed on both sides in the vehicle width direction of the cowl top main body 81.

Figure 8:
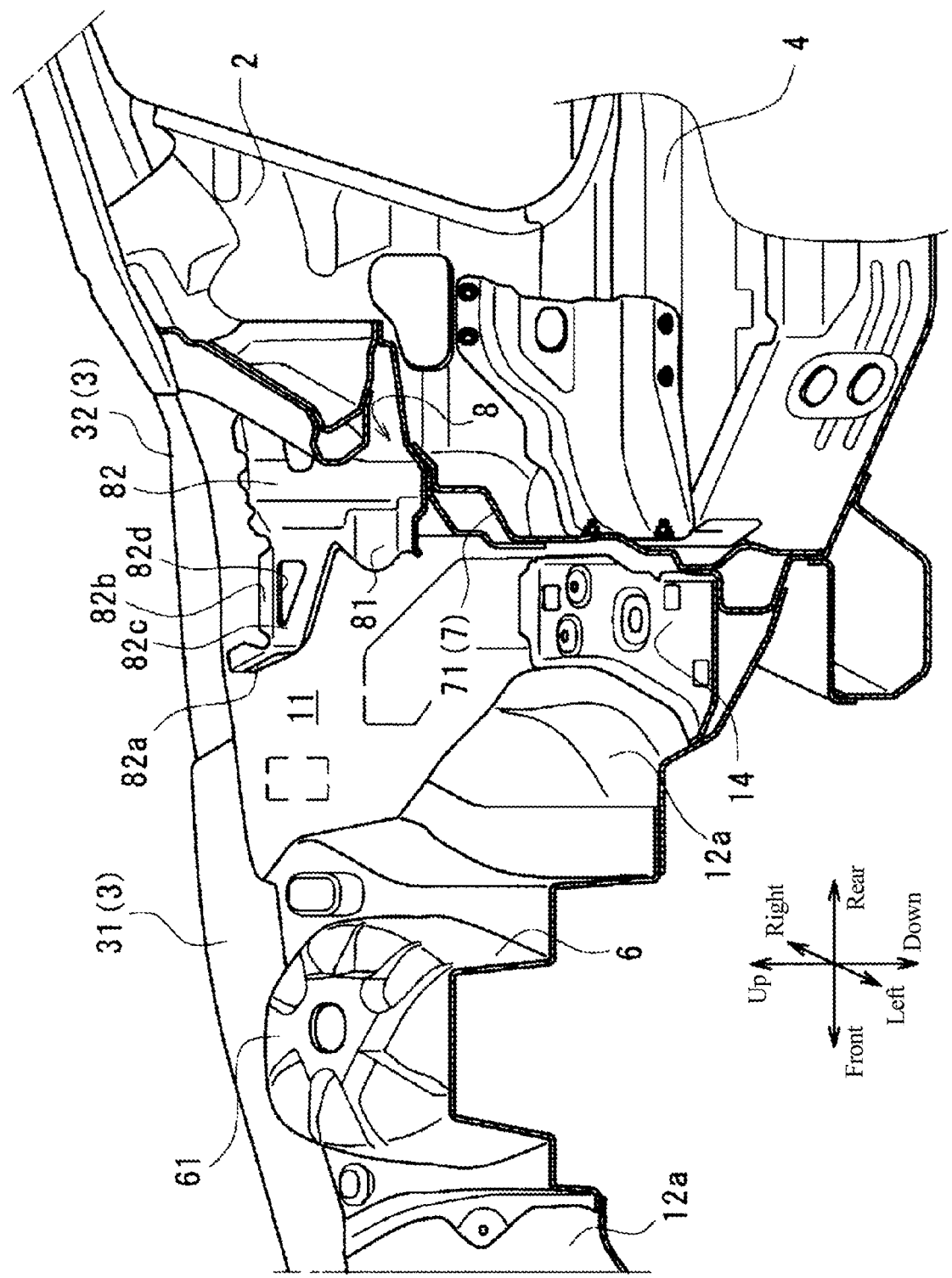
FIG. 8 is a sectional view taken along a line VIII-VIII in FIG. 3.

FIG. 8 is a sectional view taken along a line in FIG. 3 along the front-rear direction and the vertical direction of the dash panel 7 and the cowl top panel 8. As illustrated in FIG. 8, the cowl top main body 81 is coupled along an upper edge of the dash panel main body 71 at a substantially intermediate position in the front-rear direction.

A length in the front-rear direction of the cowl top coupling portion 82 is formed longer than a length in the front-rear direction of the cowl top main body 81, a front end 82a is located in front of the cowl top main body 81, and an outside flange 82b extending upward is formed at the outside end in the vehicle width direction. In the cowl top coupling portion 82, a step portion 82c lower than the periphery is formed in the vicinity of the outside flange 82b, and a cowl top opening 82d vertically penetrating the cowl top coupling portion 82 is formed in the step portion 82c. In the cowl top panel 8, the outside flange 82b is coupled to the cowl side panel 11 from the inside in the vehicle width direction.

The vertical position of the cowl top coupling portion 82 is located at the same position as the apron reinforcement 3 (rear apron reinforcement 32). Consequently, the cowl top panel 8 supports the apron reinforcement 3 from the inside in the vehicle width direction, so that the rigidity in the vehicle width direction of the apron reinforcement 3 can efficiently be improved.

Figure 9:
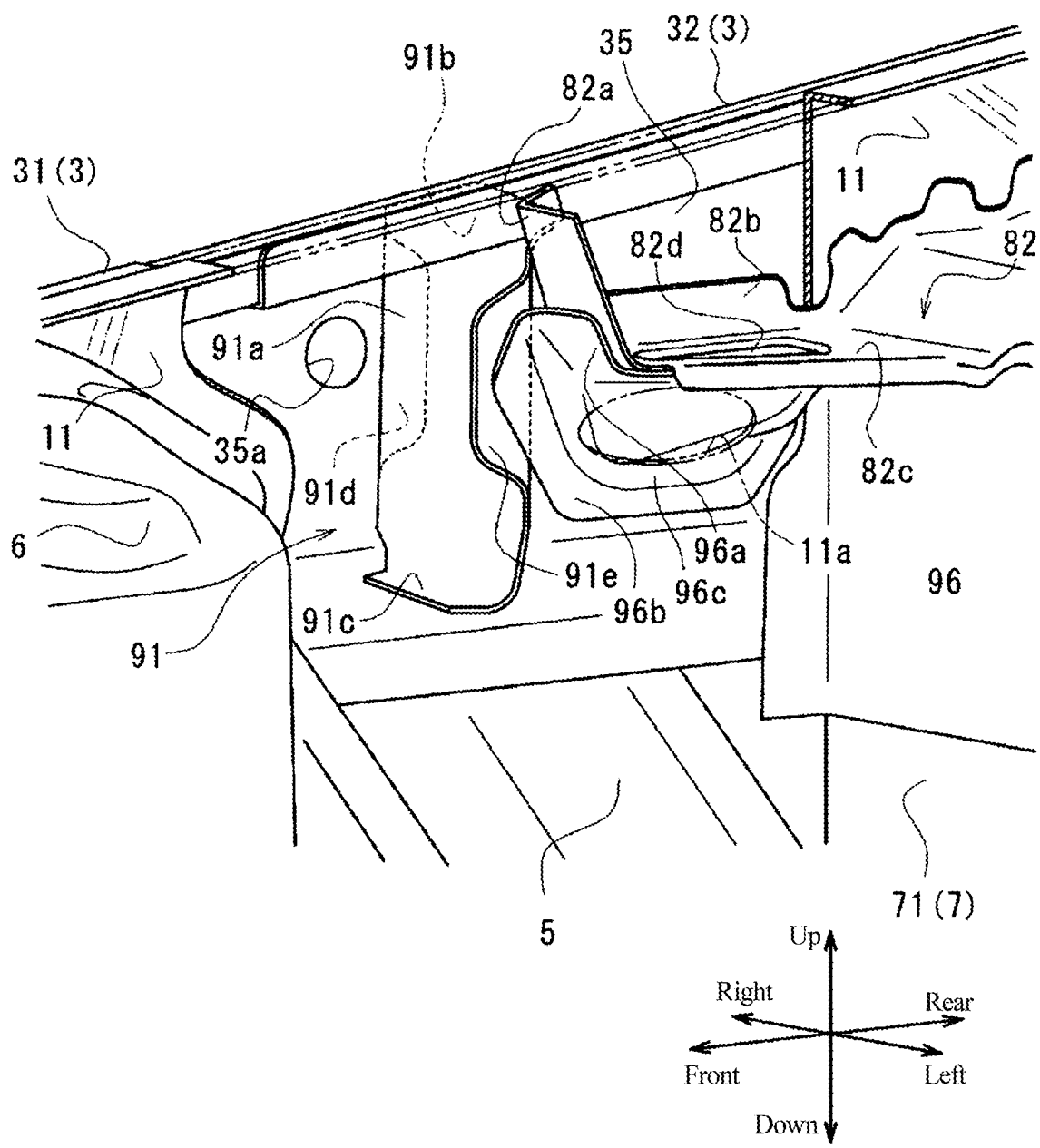
FIG. 9 is an enlarged view as viewed in a direction of an arrow A in FIG. 1.

FIG. 9 is a view as seen in a direction of an arrow A in FIG. 1, and illustrates the periphery of the right cowl top coupling portion 82 in an enlarged manner. In FIG. 9, the cowl side panel 11 is partly illustrated through the cowl side panel 11 as indicated by a broken line. A brace member 96 that connects the lower portion of the cowl top coupling portion 82 to the cowl side panel 11 from the inside in the vehicle width direction is provided as illustrated in FIG. 9.

The brace member 96 includes an upper flange 96a extending in the vehicle width direction to be coupled to the cowl top coupling portion 82 from the lower side, an outside flange 96b extending vertically to be coupled to the cowl side panel 11 from the inside in the vehicle width direction, and a brace main body 96c connecting the upper flange 96a and the outside flange 96b into a bag shape. The brace member 96 reinforces the coupling rigidity of the cowl top coupling portion 82 to the cowl side panel 11, so that the rigidity in the vehicle width direction of the apron reinforcement 3 can be improved more efficiently.

In side view of the vehicle, the outside flange 96b is configured to face the first reinforcing member 91 with the cowl side panel 11 interposed therebetween. That is, in side view of the vehicle, the outside flange 96b overlaps the first reinforcing member 91. Consequently, in the closed section constructed with the apron reinforcement 3, the higher sectional-strength portion reinforced by the first reinforcing member 91 can be supported by the cowl top panel 8 from the inside in the vehicle width direction. As a result, the rigidity in the vehicle width direction of the apron reinforcement 3 can be improved more efficiently.

As used herein, the term of overlapping means that at least a part of a certain member and at least a part of another member overlap each other.

In the cowl side panel 11, a cowl side opening 11a penetrating in the vehicle width direction is formed at a position where the cowl side opening 11a faces the brace main body 96c. Consequently, rainwater or the like flowing into the cowl top main body 81 from between a bonnet and a windshield (not illustrated) is guided to the step portion 82c lower than the periphery by one step, and passes through the cowl top opening 82d to be discharged to the inside of the brace member 96.

Also referring to FIG. 6, the rainwater or the like discharged to the brace member 96 passes through the cowl side opening 11a to be discharged into the closed section formed by the apron reinforcement 3, and is discharged from the closed section of the apron reinforcement 3 to the outside of the engine room E through a discharge path (not illustrated). Thus, the rainwater or the like flowing onto the cowl top panel 8 can be discharged to the outside of the engine room E while prevented from flowing into the engine room E.

As illustrated in FIG. 9, an opening 35a penetrating in the vehicle width direction is formed in the side surface portion 35 of the rear apron reinforcement 32. The opening 35a faces the inside flange 91e of the first connecting member 91 provided inside the closed section constructed with the rear apron reinforcement 32.

Consequently, even if the cowl side panel 11 is coupled to the upper flange 33a and the lower flange 34a of the rear apron reinforcement 32 to form the closed section after the first connecting member 91 is coupled to the upper surface portion 33, the lower surface portion 34, and the side surface portion 35 of the rear apron reinforcement 32, the coupling tool (for example, a spot-welding gun) can access the inside flange 91e through the opening 35a. As a result, the periphery of the reinforcing member is coupled to each wall of the closed section while the reinforcing member is provided in the closed section.

In the front body structure 1 of the present embodiment, the following effects are obtained.

The rigidity in the vehicle width and vertical directions of the apron reinforcement 3 can be improved by constructing the closed section of the apron reinforcement 3 (rear apron reinforcement 32) with the cowl side panel 11 constituting the side wall in the vehicle width direction of the engine room E.

Additionally, the first reinforcing member 91 can improve the sectional rigidity in the vehicle width and vertical directions of the apron reinforcement 3 (the rear apron reinforcement 32), and improve the bending rigidity in the vehicle width direction of the cowl side panel 11 overlapping the apron reinforcement 3. Consequently, the apron reinforcement 3 and the cowl side panel 11 effectively prevent deformation (for example, the inward inclination inclined inward in the vehicle width direction) in the vertical and vehicle width directions of the suspension housing 6 due to load input in the vertical direction from the suspension, so that the NVH performance of the vehicle can be improved.

Because the cowl side panel 11 is supported in the vehicle width direction by the cowl top panel 8, the rigidity in the vehicle width direction is improved.

Further, because the cowl side panel 11 continues to the apron reinforcement 3 (rear apron reinforcement 32) with the first reinforcing member 91 interposed therebetween, the rigidity in the vehicle width direction of the apron reinforcement 3 is improved. Consequently, the apron reinforcement 3, the cowl side panel 11, and the cowl top panel 8 effectively prevent the deformation (for example, the inward inclination inclined inward in the vehicle width direction) in the vertical direction, particularly the vehicle width direction of the suspension housing 6 due to the load input in the vertical direction from the suspension, so that the NVH performance of the vehicle can be improved.

Because the apron reinforcement 3 and the side sill 4 continue to each other with the first and second bent portions 52, 54 interposed therebetween, a vertical load transmitted from the suspension housing 6 to the apron reinforcement 3 is efficiently transmitted to the side sill 4 through the first and second bent portions 52, 54. In this case, because the vertical load acts as a load in a tensile or compression direction on the first and second bent portions 52, 54 having the high rigidity, it is easy to resist the load. Thus, the deformation in the vertical direction of the apron reinforcement 3 is easily prevented, and the vertical rigidity of the apron reinforcement 3 can be improved. As a result, the apron reinforcement 3 can prevent the vertical deformation of the suspension housing 6 due to vibration input from the suspension, thereby improving the NVH performance of the vehicle.

The rigidity of the closed section constructed with the apron reinforcement 3, the hinge pillar 2, and the side sill 4 is improved by providing the first to third reinforcing members 91 to 93, so that the sectional deformation can easily prevent even under the load from the suspension to the suspension housing 6. Consequently, the vertical load transmitted to the suspension housing 6 can be transmitted from the apron reinforcement 3 to the side sill 4 while a loss is prevented through the first to third reinforcing members 91 to 93. A load transmission path can continuously be made from the upper portion of the apron reinforcement 3 to the lower portion of the side sill 4 by the first to third reinforcing members 91 to 93 and the connecting member 5. Thus, the input load to the suspension housing 6 can be transmitted more efficiently from the apron reinforcement 3 to the side of the side sill 4.

The rear surface portion 51 (and the first bent portion 52) and the partition wall 92a of the second reinforcing member 92 extend at the substantially same angle with respect to the horizontal direction in side view of the vehicle, so that the load transmission between the rear surface portion 51 and the partition wall 92a can be performed more efficiently while the loss is prevented.

Because the second step portion 21d, the rear surface portion 51 (and the first bent portion 52), and the partition wall 92a of the second reinforcing member 92 are orthogonal to one another in side view of the vehicle, the coupling portion W where the second step portion 21d, the rear surface portion 51, and the partition wall 92a are coupled to one another can easily be seen from the front surface, and the coupling device such as a spot-welding gun is easily positioned at the coupling portion W, so that coupling workability is good and coupling quality is easily improved.

The load transmission path can be branched into a load transmission path extending rearward and downward by the second reinforcing member 92 and a load transmission path extending rearward by the fourth reinforcing member 94 on the opposite side to the apron reinforcement 3 with respect to the coupling portion W of the first bent portion 52 to the second step portion 21d of the hinge pillar 2. That is, because the apron reinforcement 3 can be supported more firmly by the forked load transmission path against the vertical load input to the apron reinforcement 3, the vertical deformation of the apron reinforcement 3 can further be prevented.

The first to fifth reinforcing members 91 to 95 can easily be constructed by forming the first to fifth reinforcing members 91 to 95 as the bulkhead-shaped member.

The brace member 96 further improves connection rigidity between the cowl top panel 8 and the cowl side panel 11, and therefore the rigidity in the vehicle width direction of the apron reinforcement 3 and the cowl side panel 11 is further improved. Consequently, the rigidity in the vehicle width direction of the suspension housing 6 is further improved, so that the NVH performance of the vehicle can further be improved.

In the above embodiment, the first to fifth reinforcing members 91 to 95 are formed as the bulkhead-shaped member. However, the first to fifth reinforcing members 91 to 95 are not limited to the bulkhead-shaped member, but may be formed into a box shape. That is, adjacent flanges extending in the extending direction of the closed section from the peripheral edge of the partition wall that partitions each closed section so as to intersect the extending direction of the closed section may be coupled to each other or integrally formed so as to be continuous. The fact that adjacent flanges are coupled or integrally formed so as to be continuous means that adjacent flanges may be integrally formed, or individually-formed flanges may be coupled by appropriate coupling means.

In short, by the partition wall and the adjacent flanges extending from the peripheral edge of the partition wall, not a corner formed by simple straight bending, but a corner constructed with at least three surfaces or a ridge line of the corner may be formed so as to be not linear but curved or bent. Consequently, the rigidity of the reinforcing member is further improved by forming the reinforcing member into the box shape compared with the case that the reinforcing member is formed as the bulkhead-shaped member, and therefore the rigidity of the closed section in which the reinforcing member is provided can be improved more effectively. As a result, the rigidity in the vertical and vehicle width directions of the suspension housing is further improved, so that the NVH performance of the vehicle can further be improved.

Figure 10:
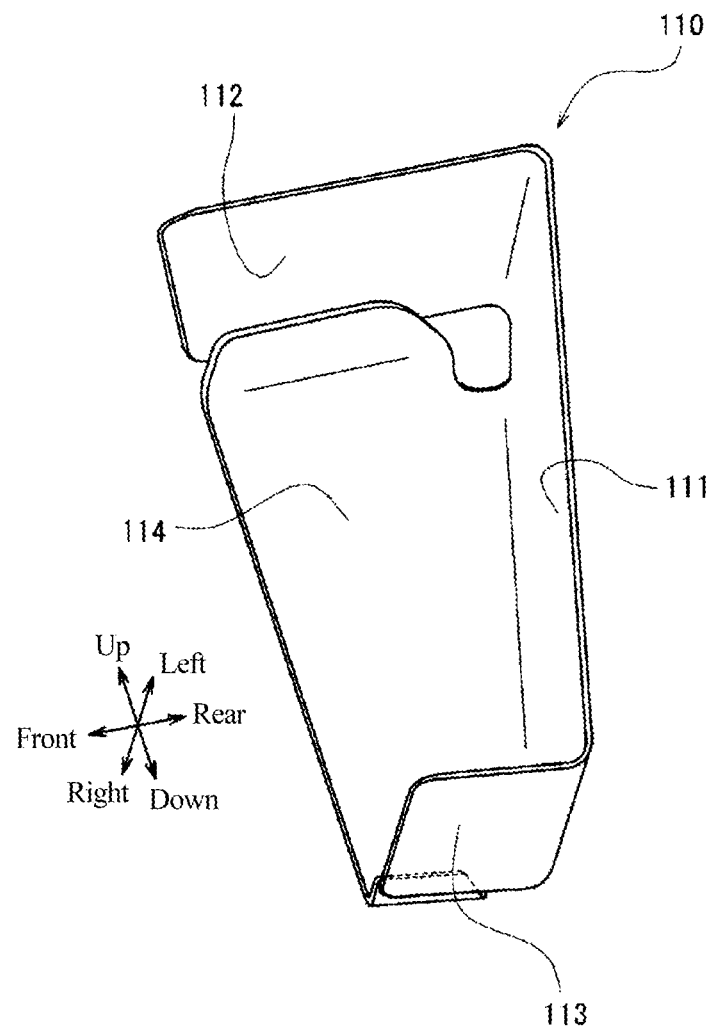
FIG. 10 is a perspective view illustrating a first reinforcing member according to a modification.

A modification of the first reinforcing member 91 will be described with reference to FIG. 10. As illustrated in FIG. 10, a first reinforcing member 110 of the modification includes a partition wall 111 that partitions the closed section constructed with the apron reinforcement 3 back and forth, and an upper surface portion 112, a lower surface portion 113, and an outside surface portion 114, which extend forward from the upper end, the lower end, and the outside end in the vehicle width direction of the partition wall 111, respectively. The upper surface portion 112 and the outside surface portion 114 are coupled so as to be continuous at the edge where the upper surface portion 112 and the outside surface portion 114 are adjacent to each other, and the lower surface portion 113 and the outside surface portion 114 are coupled so as to be continuous at the edge where the lower surface portion 113 and the outside surface portion 114 are adjacent to each other. Consequently, the first reinforcing member 110 is formed into a box shape in which a corner is constructed with three surfaces including the upper surface portion 112, the outside surface portion 114, and the partition wall 111 while a corner is constructed with three surfaces including the lower surface portion 113, the outside surface portion 114, and the partition wall 111, and the rigidity can effectively be improved.

Although not illustrated, in the first reinforcing member 110, the upper surface portion 112, the lower surface portion 113, and the outside surface portion 114 are coupled to the upper surface portion 33, the lower surface portion 34, and the side surface portion 35 of the rear apron reinforcement 32 from the inside of the section, respectively.

Various modifications and changes can be made without departing from the spirit and scope of the present invention as set forth in the claims.

INDUSTRIAL APPLICABILITY

As described above, according to the front body structure 1 of the automobile of the present invention, by preventing the deformation in the vehicle width direction of the apron reinforcement, the deformation in the vehicle width direction of the suspension housing is prevented to improve the NVH performance, so that there is a possibility that the front body structure 1 of the present invention is suitably used in this kind of manufacturing technology field.

LIST OF REFERENCE CHARACTERS 1 front body structure
2 hinge pillar
3 apron reinforcement
4 side sill
5 connecting member
6 suspension housing
7 dash panel
8 cowl top panel
11 cowl side panel
12 wheel house
13 side frame
14 apron rear panel
91 first reinforcing member
92 second reinforcing member
93 third reinforcing member
94 fourth reinforcing member
95 fifth reinforcing member
96 brace member
C vehicle interior
E engine room
W coupling portion

The invention claimed is:
1. A vehicle front body structure comprising:
a dash panel extending in a vehicle width direction to separate an engine room from a vehicle interior;
an apron reinforcement extending forward on an outside in the vehicle width direction of the engine room;
a suspension housing coupled to the apron reinforcement in front of the dash panel;
a cowl side panel extending in a front-rear direction between a rear portion of the suspension housing and the dash panel in side view of the vehicle, the cowl side panel constituting a wall portion on the outside in the vehicle width direction of the engine room; and
a cowl top panel that extends in the vehicle width direction while being coupled to an upper portion of the dash panel, the cowl top panel being disposed rearward and away from the suspension housing, wherein
the cowl top panel includes a cowl top main body extending in the vehicle width direction and cowl top coupling portions provided respectively on both sides in the vehicle width direction of the cowl top main body, the cowl top coupling portions extending in the front-rear direction and being coupled to the cowl side panel,
each of the cowl top coupling portions has a front end located forward of the both sides in the vehicle width direction of the cowl top main body and is disposed rearward and away from the suspension housing,
the apron reinforcement constitutes a closed section together with the cowl side panel, and
a reinforcing member is provided inside the closed section to partition the closed section forward and rearward, the reinforcing member being located at a position such that the reinforcing member overlaps the front end of the cowl top coupling portion in side view of the vehicle.

2. The vehicle front body structure according to claim 1, wherein in the reinforcing member, a partition wall partitioning a space surrounded by the apron reinforcement and the cowl side panel is formed into a plate shape.

3. The vehicle front body structure according to claim 1, wherein
the reinforcing member includes:
a partition wall partitioning an inside of the closed section forward and rearward; and
at least two side surface portions extending in the front-rear direction from a peripheral edge of the partition wall, the two side surface portions being coupled to the apron reinforcement and/or the cowl side panel, and
the two side surface portions are coupled or integrally formed so as to be continuous.

4. The vehicle front body structure according to claim 1, wherein
the reinforcing member includes a partition wall partitioning an inside of the closed section forward and rearward, an upper surface portion extending forward from an upper end of the partition wall, a lower surface portion extending forward from a lower end of the partition wall, and an outside surface portion extending forward from an outside end in the vehicle width direction of the partition wall,
the upper surface portion and the outside surface portion are coupled so as to be continuous at an edge where the upper surface portion and the outside surface portion are adjacent to each other, and
the lower surface portion and the outside surface portion are coupled so as to be continuous at an edge where the lower surface portion and the outside surface portion are adjacent to each other.

5. The vehicle front body structure according to claim 4, wherein the reinforcing member is formed into a box shape having a corner constructed with three surfaces including the upper surface portion, the outside surface portion, and the partition wall and a corner constructed with three surfaces including the lower surface portion, the outside surface portion, and the partition wall.

\* \* \* \* \*